(12) United States Patent
Lee

(10) Patent No.: US 11,095,701 B2
(45) Date of Patent: Aug. 17, 2021

(54) METHOD AND APPARATUS FOR PROVIDING ADAPTIVE STREAMING SERVICE

(71) Applicant: SK TELECOM CO., LTD., Seoul (KR)

(72) Inventor: Jongmin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/191,810

(22) Filed: Nov. 15, 2018

(65) Prior Publication Data

US 2019/0089761 A1 Mar. 21, 2019

Related U.S. Application Data

(63) Continuation of application No. PCT/KR2017/005174, filed on May 18, 2017.

(30) Foreign Application Priority Data

| May 18, 2016 | (KR) | 10-2016-0060954 |
| May 24, 2016 | (KR) | 10-2016-0063565 |
| Jan. 10, 2017 | (KR) | 10-2017-0003833 |

(51) Int. Cl.
*H04L 29/06* (2006.01)
*H04L 12/801* (2013.01)
*H04L 12/811* (2013.01)
*H04L 12/851* (2013.01)

(52) U.S. Cl.
CPC .......... *H04L 65/607* (2013.01); *H04L 47/115* (2013.01); *H04L 47/38* (2013.01); *H04L 65/4084* (2013.01); *H04L 65/80* (2013.01); *H04L 47/24* (2013.01)

(58) Field of Classification Search
CPC ....... H04L 47/24; H04L 47/38; H04L 47/115; H04L 65/80; H04L 65/607; H04L 65/4084

See application file for complete search history.

(56) References Cited

U.S. PATENT DOCUMENTS 9,003,558 B1 4/2015 Dorwin et al.
9,686,234 B1* 6/2017 Dorwin ................. H04L 47/801
(Continued)

FOREIGN PATENT DOCUMENTS

| JP | 2015512205 A | 4/2015 |
| WO | 2014/171806 A1 | 10/2014 |

OTHER PUBLICATIONS

International Telecommunications Union, "Service configuration, media transport protocol, and signalling information for MMT-based broadcasting systems", May 2015, ITU, BT.2074-0, pp. 1-23.*

(Continued)

*Primary Examiner* — Azizul Choudhury
(74) *Attorney, Agent, or Firm* — Hauptman Ham, LLP

(57) ABSTRACT

The present disclosure relates to a method for providing an adaptive streaming service and, more particularly, to a method for providing an adaptive streaming service, and a device therefor, the method being capable of adaptively changing the quality of a streaming service and providing the same by considering a service quality processing state in a terminal using the streaming service.

8 Claims, 6 Drawing Sheets

(56) References Cited

U.S. PATENT DOCUMENTS

| | | | |
|---|---|---|---|
| 2008/0022343 A1* | 1/2008 | Hodzic | H04N 21/23109 |
| | | | 725/115 |
| 2008/0259800 A1* | 10/2008 | Clark | H04L 43/12 |
| | | | 370/235 |
| 2012/0278441 A1 | 11/2012 | Li et al. | |
| 2013/0298170 A1* | 11/2013 | ElArabawy | H04L 47/30 |
| | | | 725/62 |
| 2014/0344470 A1 | 11/2014 | Lee et al. | |
| 2014/0351638 A1* | 11/2014 | Chang | H04L 1/08 |
| | | | 714/18 |
| 2015/0026749 A1 | 1/2015 | Bringuier et al. | |
| 2015/0032845 A1 | 1/2015 | Bouazizi et al. | |
| 2016/0127753 A1* | 5/2016 | Li | H04N 21/8456 |
| | | | 725/62 |
| 2017/0195209 A1* | 7/2017 | Singh | H04L 67/322 |

OTHER PUBLICATIONS

Broadcast Technology, "Development of Media Transport Protocol for 8K Super Hi-Vision Satellite Broadcasting System Using MMT", Summer 2015, Broadcast Technology, No. 61, pp. 12-21.*
Korean Notice of Allowance dated May 10, 2019, in connection with the Korean Patent Application No. 10-2017-0003833.
International Search Report for PCT/KR2017/005174 dated Aug. 8, 2017.
Indian Office Action dated May 23, 2021, in connection with the Indian Patent Application No. 201817047756.

* cited by examiner

METHOD AND APPARATUS FOR PROVIDING ADAPTIVE STREAMING SERVICE

CROSS-REFERENCE TO RELATED APPLICATIONS

The present application is a continuation of International Patent Application No. PCT/KR2017/005174, filed on May 18, 2017, which is based upon and claims the benefit of priority to Korean Patent Application No. 10-2016-0060954, filed on May 18, 2016, Korean Patent Application No. 10-2016-0063565, filed on May 24, 2016, and Korean Patent Application No. 10-2017-0003833, filed on Jan. 10, 2017. The disclosures of the above-listed applications are hereby incorporated by reference herein in their entirety.

TECHNICAL FIELD

The present disclosure relates to technology of providing an adaptive streaming service. More particularly, the present disclosure relates to a method and apparatus for providing an adaptive streaming service by adaptively changing the quality of a streaming service in consideration of a service quality processing state in a terminal using the streaming service.

BACKGROUND ART

Descriptions made in this section merely provide background information of embodiments of the present disclosure and do not constitute conventional art.

Streaming refers to the transmission of content, such as video or audio, from a server to a client terminal over a network such as the Internet. Since data is processed as if water is flowing, it is called streaming. The streaming server divides the data into a plurality of streaming data packets to be delivered to the client terminal via the network. The client terminal collects such packets received from the server, restores the packets to their original form, and plays them. The reception and playback of packets occur simultaneously, and a series of related packets is called a stream.

In such a streaming service, the demand for high-quality live broadcasting, especially the demand for real-time live streaming service in a smart phone, is increasing explosively. Accordingly, in order to meet such demand, an adaptive streaming service for providing a streaming service smoothly has attracted attention.

The adaptive streaming service is proposed to consider various network environments in a rapidly changing mobile environment and thus means a scheme of variably changing the transmission quality of the streaming service according to variations in the transmission bandwidth or variations in the performance of a user device. In a typical adaptive streaming service, the same videos encoded with different bit rates are stored in the form of chunks into which the video is divided with a certain length. The terminal checks periodically a variable reception environment and requests and receives a video of the most suitable bit rate from the streaming server. Therefore, the streaming server should have stored in advance the chunks encoded according to each bit rate, and this may often cause a delay of streaming.

A streaming technique of transmitting a frame-based packet is used to provide a low-delay streaming service. However, in this technique, it is difficult to determine a condition for raising a service quality. Therefore, there is difficulty in providing a streaming service with a suitable resolution in consideration of a variable terminal environment.

SUMMARY

In order to solve the above-discussed problems, the present disclosure has an object of implementing a method and apparatus for providing an adaptive streaming service by adaptively changing the quality of a streaming service in consideration of a service quality processing state in a terminal using the streaming service.

Particularly, the present disclosure has an object of implementing an adaptive streaming service providing method and apparatus capable of, when desiring to increase a service quality according to a service quality processing state in a terminal while streaming data packets are being transmitted to the terminal, collecting and transmitting streaming data packets so as to correspond to a desired upper-level service quality and then quickly switching to a high-quality streaming service without delay in consideration of a reception response of the terminal.

In addition, the present disclosure has an object of implementing an adaptive streaming service providing method and apparatus capable of effectively managing, in accordance with an MMT communication protocol, the quality of a streaming service offered to a terminal in an ever-changing mobile network environment and also performing a probing procedure therefor.

However, the present disclosure is not limited to the above objects, and any other object, even though not mentioned herein, may be well understood from the following description.

In order to accomplish the above objects, according to an embodiment of the present disclosure, a method for providing an adaptive streaming service at a streaming server may comprise providing a streaming data packet to a terminal, the streaming data packet corresponding to a predetermined streaming service quality; identifying an upper-level service quality than a current service quality being served to the terminal when a probe-required message for a service quality change is received from the terminal; transmitting a probing packet corresponding to the upper-level service quality to the terminal by a probing number of times at a predetermined probing interval according to a probing request message; receiving a probing response message including a reception measurement result of the probing packet from the terminal; determining, by using the probing response message, whether a service quality increasing condition is satisfied; when the service quality increasing condition is satisfied in the terminal, determining the upper-level service quality as a streaming service quality of streaming data; and transmitting a streaming data packet changed with the determined streaming service quality to the terminal.

The method may further comprise, before the providing the streaming data packet to the terminal, receiving service quality processing state information from the terminal according to a streaming service provision request of the terminal; and determining a streaming service quality to be provided to the terminal according to the received service quality processing state information.

In addition, the probe-required message for the service quality change may occur when service quality processing state information of the terminal satisfies a predetermined condition.

Here, the service quality processing state information may include terminal state information and network state information measured by the terminal.

In addition, the transmitting the probing packet to the terminal may include transmitting the probing packet corresponding to the upper-level service quality to the terminal according to the probing request message defined in accordance with an MMT communication protocol and including packet information for probing (probing_packet_location), a probing start time (probing_start_time), a probing duration (probing_slot_duration), a probing interval (probing_slot_interval), and a probing number of times (probing_slot_number).

Here, the probing response message may include, in addition to the reception measurement result of the proving packet, a mobile information descriptor (mobile_info_descriptor) having information on an MMT receiving entity.

Also, the reception measurement result of the probing packet may be composed of the information on the MMT receiving entity and information on a average bandwidth (average_rate), a bandwidth peak (peak_rate), and a packet loss ratio (packet_loss_ratio).

In addition, the present disclosure may provide a computer-readable recording medium storing a program for executing the above-mentioned method.

In addition, the present disclosure may provide a computer program stored in a computer-readable recording medium implemented to execute the above-mentioned method.

In order to accomplish the above objects, according to an embodiment of the present disclosure, a computer-readable recording medium may store a program for executing operations of defining a probing request message in accordance with an MMT communication protocol, wherein the probing request message includes packet information for probing (probing_packet_location), a probing start time (probing_start_time), a probing duration (probing_slot_duration), a probing interval (probing_slot_interval), and a probing number of times (probing_slot_number); and defining a probing response message corresponding to the probing request message, wherein the probing response message includes a mobile information descriptor (mobile_info_descriptor) and a reception measurement result of a probing packet, wherein the mobile information descriptor has information on an MMT receiving entity, and wherein the reception measurement result of the probing packet is composed of information on a average bandwidth (average_rate), a bandwidth peak (peak_rate), and a packet loss ratio (packet_loss_ratio).

In order to accomplish the above objects, according to an embodiment of the present disclosure, a streaming server may comprise a service quality processing module configured to determine a streaming service quality corresponding to a terminal that requests a streaming service, and identify an upper-level service quality than the streaming service quality in response to a request of a streaming service providing module; and the streaming service providing module configured to provide a streaming data packet to the terminal according to the determined streaming service quality, identify, through the service quality processing module, the upper-level service quality than a current service quality being served to the terminal when a probe-required message for a service quality change is received from the terminal, transmit a probing packet corresponding to the upper-level service quality to the terminal by a probing number of times at a predetermined probing interval according to a probing request message, and when a probing response message including a reception measurement result of the probing packet is received from the terminal, and when a service quality increasing condition is determined to be satisfied in the terminal through the probing response message, transmit a streaming data packet changed with the identified upper-level service quality.

Here, the streaming data packet may be generated in accordance with an MMT (MPEG Media Transport) communication protocol, and each streaming data packet may be encoded in units of MPU (Media Processing Unit).

In addition, the service providing module may be further configured to transmit the probing packet to the terminal according to the probing request message including packet information for probing (probing_packet_location), a probing start time (probing_start_time), a probing duration (probing_slot_duration), a probing interval (probing_slot_interval), and a probing number of times (probing_slot_number), and receive the probing response message corresponding to the probing request message from the terminal, wherein the probing response message includes a mobile information descriptor (mobile_info_descriptor) and a reception measurement result of a probing packet, wherein the mobile information descriptor has information on an MMT receiving entity, and wherein the reception measurement result of the probing packet is composed of information on a average bandwidth (average_rate), a bandwidth peak (peak_rate), and a packet loss ratio (packet_loss_ratio).

In order to accomplish the above objects, according to an embodiment of the present disclosure, a computer-readable recording medium may store a program for executing operations of defining a probing request message in accordance with an MMT communication protocol, wherein the probing request message includes packet information for probing (probing_packet_location), a probing start time (probing_start_time), a probing duration (probing_slot_duration), a probing interval (probing_slot_interval), and a probing number of times (probing_slot_number); and defining a probing response message corresponding to the probing request message and including a mobile information descriptor (mobile_info_descriptor) having information on an MMT receiving entity and a reception measurement result of the probing packet composed of information on a average bandwidth (average_rate), a bandwidth peak (peak_rate), and a packet loss ratio (packet_loss_ratio).

In order to accomplish the above objects, according to an embodiment of the present disclosure, a streaming server may comprise a service quality processing module configured to determine a streaming service quality corresponding to a terminal that requests a streaming service, and identify an upper-level service quality than the streaming service quality in response to a request of a streaming service providing module; and the streaming service providing module configured to provide a streaming data packet to the terminal according to the determined streaming service quality, identify, through the service quality processing module, the upper-level service quality than a current service quality being served to the terminal when a change of the streaming service quality corresponding to the terminal is required, transmit a probing packet corresponding to the upper-level service quality to the terminal by a predetermined number of times at a predetermined time interval so as to correspond to the identified upper-level service quality, and when a service quality increasing condition is satisfied in the terminal, transmit a streaming data packet changed with the identified upper-level service quality.

Here, the streaming data packet may be generated in accordance with an MMT (MPEG Media Transport) communication protocol, and each streaming data packet may be encoded in units of MPU (Media Processing Unit).

Here, the service providing module may be further configured to transmit the probing packet to the terminal according to a probing request message including packet information for probing (probing_packet_location), a probing start time (probing_start_time), a probing duration (probing_slot_duration), a probing interval (probing_slot_interval), and a probing number of times (probing_slot_number), and determine using a probing response message whether a service quality increasing condition is satisfied, upon reception of the probing response message corresponding to the probing request message and including a mobile information descriptor (mobile_info_descriptor) having information on an MMT receiving entity and a reception measurement result of the probing packet composed of information on a average bandwidth (average_rate), a bandwidth peak (peak_rate), and a packet loss ratio (packet_loss_ratio).

According to the method and apparatus for providing the adaptive streaming service of the present disclosure, the quality of the streaming service can be improved by adaptively changing the quality of the streaming service in consideration of the service quality processing state in the terminal using the streaming service.

In addition, according to the method and apparatus for providing the adaptive streaming service of the present disclosure, when desiring to increase the service quality according to the service quality processing state in the terminal while streaming data packets are being transmitted to the terminal, it is possible to quickly switch to a high-quality streaming service without any service delay by collecting and transmitting streaming data packets so as to correspond to a desired upper-level service quality.

Other various advantages and effects will be disclosed explicitly or implicitly in embodiments of this disclosure to be described below in detail.

DETAILED DESCRIPTION

Figure 1:
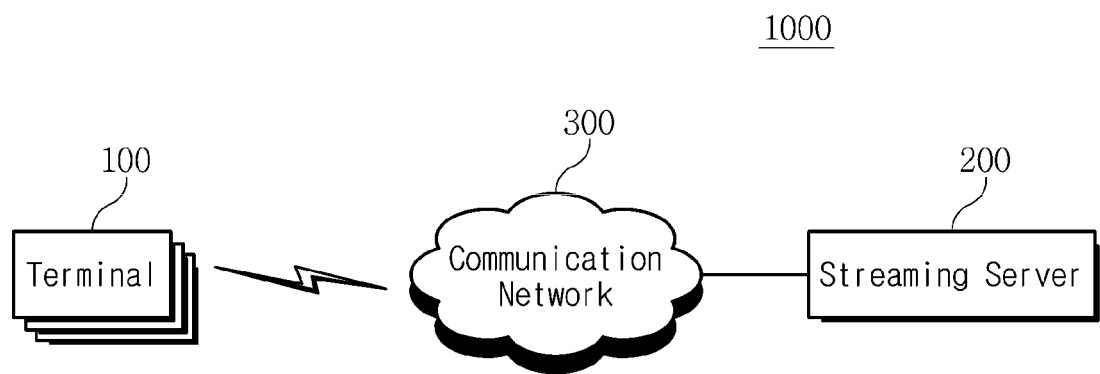
FIG. 1 is a diagram illustrating a system of providing a streaming service according to an embodiment of the present disclosure.

Hereinafter, embodiments of the present disclosure will be described in detail with reference to the accompanying drawings.

In the following description and the accompanying drawings, well-known functions or elements may not be described or illustrated in detail to avoid obscuring the subject matter of the present disclosure. The same elements may be denoted by the same reference numerals throughout the drawings.

The terms and words used herein should not be construed as limited to ordinary or dictionary definition terms, but should be construed in light of the meanings and concepts consistent with the subject matter of the present disclosure on the basis of the principle that the inventor can properly define his own disclosure as the concept of the term to describe it in the best way. It is therefore to be understood that embodiments disclosed herein are merely exemplary and various equivalents or modifications thereof are possible.

Additionally, the terms including expressions "first", "second", etc. are used for merely distinguishing one element from other elements but do not limit the corresponding elements. The above expressions do not limit the sequence and/or importance of the elements.

Further, when it is stated that a certain element is "coupled to" or "connected to" another element, the element may be logically, electrically or physically coupled to or connected to another element. Namely, the element may be directly coupled or connected to another element, or a new element may exist between both elements.

Also, the terms used in describing various embodiments of this disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the present disclosure belongs. The terms "include", "comprise", and "have" as well as derivatives thereof, mean inclusion without limitation.

In addition, embodiments within the scope of the present disclosure include computer-readable media having computer-executable instructions or data structures stored on computer-readable media. Such computer-readable media can be any available media that is accessible by a general purpose or special purpose computer system. By way of example, such computer-readable media may include, but not limited to, RAM, ROM, EPROM, CD-ROM or other optical disk storage, magnetic disk storage or other magnetic storage devices, or any other physical storage medium that can be used to store or deliver certain program codes formed of computer-executable instructions, computer-readable instructions or data structures and which can be accessed by a general purpose or special purpose computer system.

In the description and claims, the term "network" or "communication network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

In addition, a streaming service disclosed herein refers to providing various types of contents such as audio and/or video in a streaming manner. Here, streaming refers to a technique to enable the transmission and playback of a file to be performed together, thereby reducing a wait time and having no restraints in the storage capacity of a receiving end. That is, data is received in units of streaming data packets and immediately played back. In such streaming, there are VOD streaming for providing the content stored in the streaming server by a user's request, and live streaming, e.g., Internet broadcast, for broadcasting the content at a given time. The present disclosure can be applied to both of the above streaming types.

Now, a main configuration of a streaming service providing system according to an embodiment of the present disclosure will be described.

FIG. 1 is a diagram illustrating a system of providing a streaming service according to an embodiment of the present disclosure.

Referring to FIG. 1, a streaming service providing system 1000 according to an embodiment of the present disclosure may be configured to include a streaming server 200 for providing a streaming service to a plurality of terminals 100.

The terminal 100 requests the streaming server 200 to provide a streaming service for specific content through a communication network 300 by a user's request, and receives the content from the streaming server 200 in a streaming manner.

Specifically, the terminal 100 receives, from a user, a request for providing a streaming service for specific content. The streaming service providing request for specific content may be performed through a browser when a user inputs a uniform resource locator (URL) for the specific content, selects the specific content, selects a specific channel, or the like. Then, the terminal 100 identifies the streaming server 200 providing a corresponding streaming service, requests the streaming server 200 to provide the streaming service, and receives the streaming service.

The terminal 100 may be referred to as, or include all or some functions of, user equipment, a mobile station (MS), a mobile terminal (MT), a subscriber station (SS), a portable subscriber station (PSS), an access terminal (AT), or the like. In addition, according to an implementation type, the terminal 100 may be a mobile terminal such as a smart phone, a tablet PC, a personal digital assistant (PDA) or a portable multimedia player (PMP), or a stationary terminal such as a smart TV or a desktop computer. Besides, any other device capable of requesting and receiving a streaming service from the streaming server 200 through the communication network 300 may be used as the terminal 100 of the present disclosure.

The streaming server 200 is configured to provide a variety of contents such as photograph, video, audio, application, and the like to the terminal 100 in a streaming manner. The streaming server 200 manages at least one content provided by a contents provider (CP) and performs a function of providing such content to a plurality of terminals 100 via the communication network 300 in a streaming manner. Particularly, the streaming server 200 provides an adaptive streaming service to the terminal 100 by periodically checking information about a service quality processing state of the terminal 100. Also, the streaming server 200 determines a time point for quality improvement after providing a low-quality streaming service, thereby switching to and providing a high-quality streaming service without delay.

In addition, the streaming server 200 may generate an MMT streaming data packet in accordance with the MMT protocol and transmit the MMT streaming data packet to the terminal 100. Therefore, the terminal 100 may use the MMT streaming data packet received from the streaming server 200.

In addition, although not shown in the drawings, a contents server (not shown) for providing contents to the streaming server 200 may be further included. The contents server (not shown) refers to a third-party provider server, e.g., an origin server, which has and manages contents. The contents server (not shown) may be implemented as a web server, a web application server (WAS), or the like. For example, the contents server may refer to an apparatus that has broadcasting data, such as baseball broadcasts or World Cup broadcasts, sent from a head end device (not shown) of a broadcasting station. In addition, the contents server (not shown) may provide the content directly to the terminal 100 at the request of the terminal 100, and may also provide the content to the terminal 100 in conjunction with the streaming server 200 according to embodiments of the present disclosure.

An adaptive streaming service providing method of the streaming server 200 will be described in detail below. A processor equipped each apparatus according embodiments of this disclosure may process program instructions for executing the method of this disclosure. This processor may be a single-threaded processor in one implementation or a multi-threaded processor in another implementation. Further, the processor may process commands stored in a memory or any other storage.

The communication network 300 is configured to perform transmission and reception of information between the terminal 100 and the streaming server 200. In particular, the communication network 300 may be a heterogeneous network implemented using various types of wired/wireless communication technologies such as an intranet, a mobile communication network, and a satellite communication network, rather than be a single type network.

The communication network 300 may be configured to include an external network, e.g., the Internet (not shown), connected with the mobile communication network including a plurality of wired/wireless access networks (not shown) and a core network (not shown). Here, the access network of the mobile communication network performs wired/wireless communication with the terminal 10 and may be formed of a plurality of base stations (BSs) each also referred to as a base transceiver station (BTS), Node B, or evolved Node B (eNB), and a controller also referred to as a base station controller (BSC) or a radio network controller (RNC).

In another network scheme, a digital signal processor and a radio signal processor, which are typically implemented in the base station, may be separated as a digital unit (DU) and a radio unit (RU), respectively. Also, a plurality of RUs may be disposed respectively in a plurality of regions and connected to a centralized DU.

The core network (not shown) which forms the mobile communication network together with the wired/wireless access network (not shown) performs a function of connecting the wired/wireless access network to an external network such as the Internet (not shown).

The core network (not shown) is a network system that performs main functions, such as mobility control and switching between the wired/wireless access networks (not shown), for a mobile communication service. The core network (not shown) performs circuit switching or packet switching and also manages and controls a packet flow in the mobile network. Also, the core network (not shown) may manage inter-frequency mobility, control traffic therein and in the access network, and control interworking with other network such as the Internet (not shown). The core network (not shown) may further include a mobile switching center (MSC), a home location register (HLR), a mobile mobility entity (MME), a home subscriber server (HSS), and/or the like.

The Internet (not shown) is a public communication network in which information is exchanged in accordance with the TCP/IP protocol. The Internet is connected to the streaming server 200 and may perform a function of providing streaming data, received from the streaming server 200, to the terminal 100 through the core network (not shown) and the wired/wireless access network (not shown).

In the mobile network, unlike the Internet, mobile packets may be transmitted through a GPRS tunneling protocol (GTP) tunnel. For example, when the terminal 100 transmits an IP packet containing source address information (an IP address of the terminal 100) and destination address information (an IP address of the streaming server 200) to the access network (not shown) in order to send a content request message to the streaming server 200, the base station (e.g., eNodeB) of the access network (not shown) converts the IP packet into a mobile packet by adding a GTP header, a UDP header, and an IP header for GTP tunneling to the IP packet and then delivers the mobile packet to the core network (not shown). In this case, the GTP header may contain a tunneling end point ID (TEID) assigned to the terminal 100. The core network (not shown) removes the GTP header, the UDP header, and the IP header for GTP tunneling, and transmits the original IP packet, transmitted from the terminal 100, to the streaming server 200 through the Internet (not shown).

Hereinbefore, the structure of the communication network 300 has been described. In addition, the communication network 300 may include a cloud computing network capable of storing computing resources such as hardware and software and providing the computing resources, required by a client, to the terminal. Here, the cloud computing refers to a computer environment in which information is permanently stored in a server on the Internet and temporarily stored in a client terminal such as a desktop, a tablet computer, a notebook, a netbook, or a smart phone. That is, in the cloud computing environment, all kinds of information stored in a server on the Internet can be used anytime and anywhere through various IT devices. The communication network 300 includes a closed network such as a local area network (LAN) or a wide area network (WAN), an open network such as the Internet, a mobile communication network based on code division multiple access (CDMA), wideband CDMA (WCDMA), global system for mobile communications (GSM), long term evolution (LTE), or evolved packet core (EPC), a next-generation network to be implemented, and a cloud computing network.

Now, a main configuration of the terminal 100 according to an embodiment of the present disclosure will be described with reference to FIG. 2.

Figure 2:
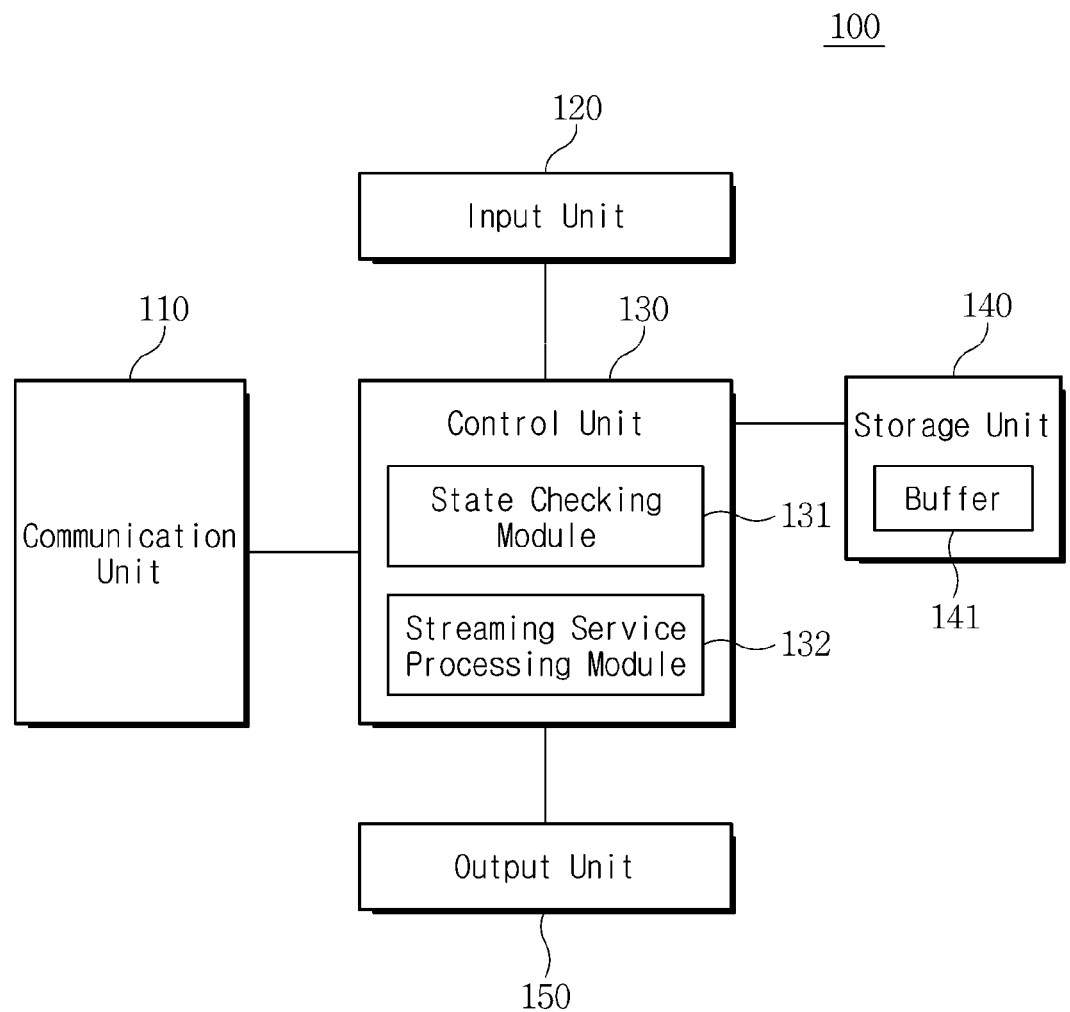
FIG. 2 is a block diagram illustrating a main configuration of a terminal according to an embodiment of the present disclosure.

FIG. 2 is a block diagram illustrating a main configuration of a terminal according to an embodiment of the present disclosure.

Referring to FIGS. 1 and 2, the terminal 100 may be configured to include a communication unit 110, an input unit 120, a control unit 130, a storage unit 140, and an output unit 150.

The communication unit 110 performs a function of transmitting or receiving information to or from the service server 200 through the communication network 300. The communication unit 110 may perform a process of accessing a neighboring access network (not shown) included in the communication network 300. For example, the communication unit 110 may access the access network through a process of discovering a base station (not shown) located within certain coverage, sending an access request to the discovered base station, and accessing the base station. Since this process is well known in the art, a detailed description will be omitted. In addition, when performing a communication procedure with the base station, the communication unit 110 may transmit user information to the base station.

Basically, terminal identification information such as an international mobile subscriber identity (IMSI) may be transmitted to the base station. Therefore, while performing an access procedure with the core network, the base station may identify subscriber information by using the terminal identification information.

In particular, the communication unit 110 that successfully accesses the core network (not shown) through the base station (not shown) of the access network (not shown) performs functions of establishing a communication channel with the streaming server 200 according to instructions of the control unit 130, transmitting a streaming service request through the established communication channel, and delivering streaming data packets, received from the streaming server 200, to the control unit 130.

Also, the communication unit 110 may perform a process of continuously checking the status of the communication channel established with the streaming server 200 under the control of the control unit 130, and may deliver related information to the control unit 130.

The input unit 120 creates an input signal associated with various kinds of information for setting or controlling a function of the terminal 100 in response to a user's manipulation and then delivers the input signal to the control unit 130. In particular, the input unit 120 may support a user input for the streaming service providing request. For example, through the input unit 120, the user can execute a broadcasting stream channel provided by the streaming server 200, execute a particular application, or select a particular menu.

The input unit 120 may include a key input mechanism such as a keyboard or a keypad, a touch input mechanism such as a touch sensor or a touch pad, a voice input mechanism, and a gesture input mechanism having at least one of a gyro sensor, a geomagnetic sensor, an acceleration sensor, a proximity sensor, and a camera. Besides, all kinds of input mechanisms being developed or to be developed may be included.

The control unit 130 performs the overall control of the terminal 100. In view of hardware, the control unit 130 may be composed of at least one processor including a central processing unit (CPU), at least one execution memory (e.g., a register and/or a random access memory (RAM)) onto which data is loaded, and a bus for inputting or outputting data to or from the processor and the memory. In view of software, the control unit 130 may include a program routine or program data loaded onto the execution memory from a recording medium and then processed by the processor so as to perform a function defined in the terminal 100. Namely, any processable function in view of software among functions of the terminal 100 so as to request the streaming server 200 to provide a streaming service and then process a streaming data packet received from the streaming server 200 may be considered as a function of the control unit 130.

The control unit 130 is functionally connected with one or more elements equipped for streaming service processing according to embodiments of this disclosure. Namely, the control unit 130 is functionally connected with the communication unit 110, the input unit 120, the storage unit 140, and the output unit 150, and controls the supply of power to each element and the flow of signals for performing functions.

In particular, the control unit 130 may perform functions of sending a streaming service providing request to the streaming server 200 through the communication unit 110 and then processing a streaming data packet received through the communication unit 110. In addition, the control unit 130 may periodically check terminal state information and network state information and control the checked information to be transmitted to the streaming server 200 via the communication unit 110. It is therefore possible to receive and process a streaming data packet with a changed streaming service quality.

For this, the control unit 130 may be configured to include a state checking module 131 and a streaming service processing module 132.

The state checking module 131 performs a function of generating service quality processing state information to be used for checking the processing degree of a streaming data packet provided by the streaming server 200. The service quality processing state information may include terminal state information and network state information. Specifically, the terminal state information indicates state information about terminal resources capable of processing a streaming data packet provided by the streaming server 200. For example, the terminal state information may include information about a current buffer status, a total buffer size, an available buffer size, maximum allowable buffer latency information, a buffering capability such as buffer overflow or underflow, and the like. The network state information indicates state information about a communication channel established between the terminal 100 and the streaming server 200 and may include, for example, a bandwidth, a transmission delay difference between packets, a packet loss rate, a retransmission count for packet loss, and the like. The bandwidth may be measured using the received packet by the control unit 130 of the terminal 100.

In addition, the state checking module 131 checks the service quality processing state information including the terminal state information and the network state information at predetermined intervals, and transmits the checked information to the streaming server 200 via the communication unit 110. Then, the streaming server 200 determines, based on the received service quality processing state information, a service quality that can be provided to the terminal 100. This is, however, exemplary only. In another embodiment, the terminal 100, instead of the streaming server 200, may directly determine the service quality by using the checked service quality processing state information. For example, with respect to the currently established communication channel, the state checking module 131 may check whether the available buffer size falls below 20%, whether the packet loss rate reaches 5% or more, whether the retransmission count for packet loss exceeds a given threshold x, or whether a buffer underflow occurs. If such a condition is satisfied, the state checking module 131 may directly determine the service quality such as changing the level of the service quality.

In addition, the state checking module 131 may periodically check the above-described service quality processing state information, and generate a probe-required message for changing the service quality. Here, the probe-required message refers to a message related to a probing procedure for changing the service quality, and may be generated when a condition for increasing the service quality is satisfied. For example, when a predetermined specific condition such as the currently available buffer size of 30% or more or the packet loss rate of 1% or less is satisfied, the state checking module 131 generates the probe-required message and transmits the message to the streaming server 200 through the communication unit 110. Thereafter, the streaming server 200 that receives the probe-required message may perform a process for increasing the service quality.

In addition, the state checking module 130 may periodically check the above-described service quality processing state information, and generate a probe-required message for changing the service quality. Here, the probe-required message refers to a message related to a probing procedure for changing the service quality, and may be generated when a condition for increasing the service quality is satisfied. For example, when a predetermined specific condition such as the currently available buffer size of 30% or more or the packet loss rate of 1% or less is satisfied, the state checking module 130 generates the probe-required message and transmits the message to the streaming server 200 through the communication unit 110. Thereafter, the streaming server 200 that receives the probe-required message may perform a process for increasing the service quality.

Meanwhile, the streaming service processing module 132 performs the overall control associated with processing the streaming service. For example, when streaming data packets are received through the communication unit 110, the streaming service processing module 132 may store the received packets in a buffer 141 of the storage unit 140 and sequentially reproduce the streaming data packets stored in the buffer 141.

In particular, the streaming service processing module 132 may support an MPEG-2 TS processing function of processing MPEG media transport (MMT) streaming data. For example, the streaming service processing module 132 may receive an MMT packet composed of a plurality of media processing units (MPUs) from the streaming server 20. If the MMT packet is formed of a plurality of assets, the streaming service processing module 132 may perform functions of synchronizing, reproducing and outputting the assets according to time information.

In addition, the streaming service processing module 132 may process various user inputs generated by the input unit 120, receive corresponding results from the streaming server 200, and provide the received results to the user through the output unit 150.

The storage unit 140 may temporarily store application programs required for the operation of functions according to embodiments of this disclosure and various data created during the execution of the application programs. In particular, the storage unit 140 may store various instructions for processing the streaming service. Also, the storage unit 140 may include a certain storage space for the buffer 141. The storage unit 140 may store streaming data packets delivered from the control unit 130 and support the sequential playback of the stored streaming data packets at the request of the control unit 130.

The storage unit 140 may include mainly a program region and a data region. The program region stores related information for the operation of the terminal 100, such as an operating system (OS) for booting the terminal 100. The data region stores data created by the use of the terminal 100, and may store various instructions for processing streaming data as mentioned above. The storage unit 140 may be configured to include various kinds of storage media such a flash memory, a hard disk, a multimedia card micro type memory (e.g., SD or XD memory, etc.), RAM, and/or ROM.

The output unit 150 displays information about a series of operation states and operation results that occur when functions of the terminal 100 are performed. Particularly, the output unit 150 may display information generated by reproducing the streaming data packet received from the streaming server 200.

Now, an example of information that can be output through the output unit 150 will be described with reference to FIG. 3.

Figure 3:
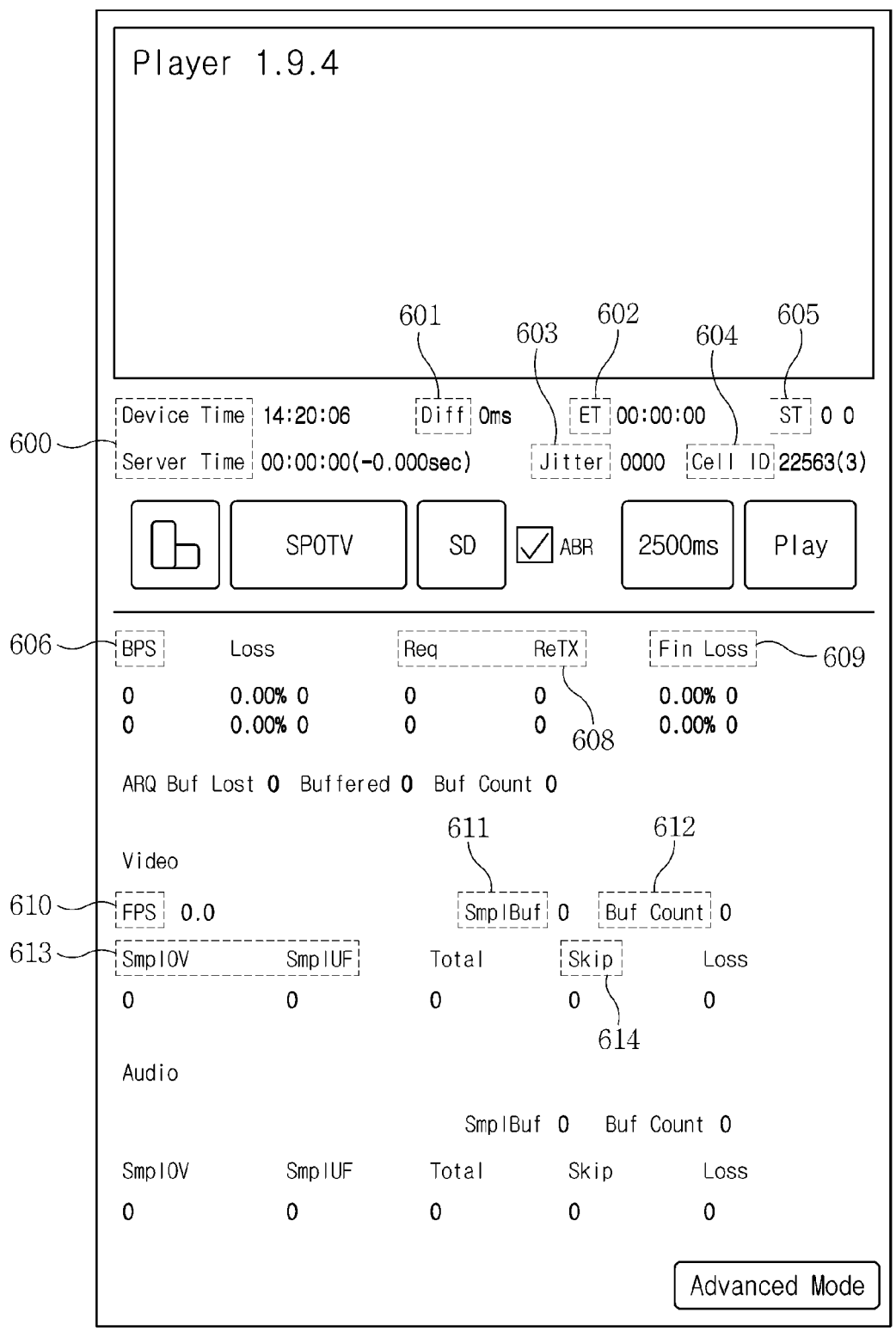
FIG. 3 is a screenshot showing a streaming playback application executed in a terminal according to an embodiment of the present disclosure.

FIG. 3 is a screenshot showing a streaming playback application executed in a terminal according to an embodiment of the present disclosure.

Referring to FIG. 3, the terminal 100 may have in advance a playback application 650 for reproducing a streaming data packet provided by the streaming server 200. The playback application 650 may be installed in the terminal 100 through download from the streaming server 200 or a third party such as an application store, or may be used by the terminal 100 in a cloud manner.

The streaming playback application 650 may have various function screens. For example, the streaming playback application 650 may provide various user interface screens for changing a streaming channel in response to a user input.

In addition, the streaming playback application 650 may provide a user interface screen for outputting buffer state information and network state information. The example shown in FIG. 3 depicts a screenshot of the user interface that outputs the buffer state information and the network state information provided by the streaming playback application 650 so that the user can recognize them. In examples of displayed information, indicated by 600 are time information of the terminal 100 and time information received from the streaming server 200. Through such time information, a difference between the reception time at the terminal 100 and the transmission time at the streaming server 200 may be perceived.

Diff indicated by 601 refers to a delay time relative to an original image, and the unit thereof is a microsecond (ms). An elapsed time (ET) indicated by 602 refers to an elapsed position in a playback time of video. Jitter indicated by 603 refers to a transmission delay time difference between packets. Cell ID indicated by 604 refers to an identifier of a currently accessed cell and may be a picocell ID, for example. ST indicated by 605 refers to a startup time through which a delay of a start time may be perceived.

In addition, BPS indicated by 606 refers to instantaneous/average bit per second, and Req/ReTX indicated by 608 refers to a retransmission count for packet loss. That is, the terminal 100 may not receive a streaming data packet transmitted by the streaming server 200 for various reasons such as packet loss and therefore may send a retransmission request to the streaming server 200. The terminal 100 counts the number of such retransmission requests for packet loss and consider this count as network state information. In addition, Fin Loss indicated by 609 relates to a packet loss rate and refers to the amount of retransmission failure packets.

In addition, a frame per second (FPS) indicated by 610 refers to the number of frames per second. SmpBuff indicated by 611 denotes a current buffer state in units of percentage (%). Buf Count indicated by 612 refers to the total buffer size. Normally, the buffer can store streaming data packets of about 12 seconds and may be fixed to 375. Smp OV and Smp UP indicated by 613 denote an overflow state of the buffer and an underflow state of the buffer, respectively. In addition, SKIP indicated by 614 refers to a skip count of image or audio. Besides, the streaming playback application 650 may provide various kinds of information such as GPS-based speed information, content type/usage amount, and statistic according to image qualities.

Returning to FIG. 2, the output unit 150 may be implemented in the form of a touch panel (or touch screen) together with the input unit 120. In this case, the output unit 150 may display various kinds of information generated according to a user's touch action.

Additionally, the display unit 150 may be formed of a liquid crystal display (LCD), a thin film transistor LCD (TFT-LCD), an organic light emitting diodes (OLED), an LED, an active matrix organic LED (AMOLED), a flexible display, a 3-dimensional display, or the like. Some of them may have a transparent or light-penetrate type of being visible to the outside. This may be configured in the form of a transparent display including a transparent OLED (TOLED).

Hereinbefore, main elements of the terminal 100 have been described through FIG. 2. The elements shown in FIG. 2 are, however, not always essential, and more or less elements than those shown may be used for the terminal 100. For example, the terminal 100 may further include an audio output unit (not shown) for converting an electric audio signal into an analog signal and then outputting the signal. This audio output unit (not shown) may output various kinds of information generated during the playback of a streaming data packet delivered from the streaming server 200.

Additionally, the main elements of the terminal 100 shown in FIG. 2 may be varied in position for convenience or any other reason.

Now, a main configuration and operating method of the streaming server 200 according to an embodiment of the present disclosure will be described.

Figure 4:
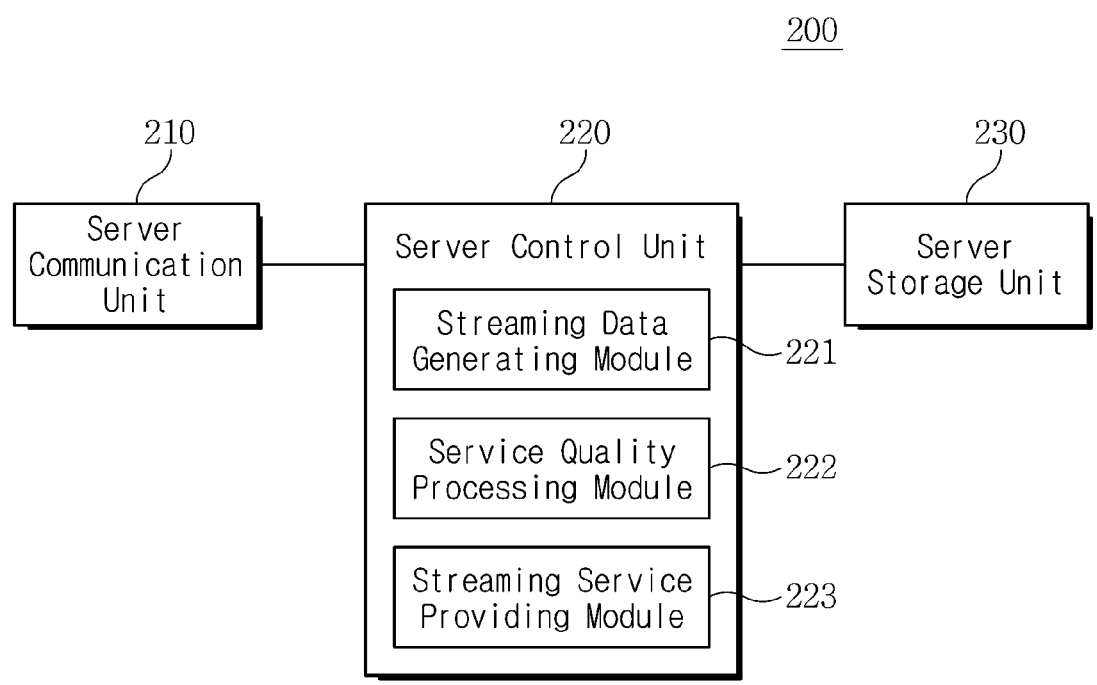
FIG. 4 is a block diagram illustrating a main configuration of a streaming server, shown in FIG. 1, according to an embodiment of the present disclosure.

FIG. 4 is a block diagram illustrating a main configuration of a streaming server, shown in FIG. 1, according to an embodiment of the present disclosure.

Referring to FIGS. 1 and 4, the streaming server 200 may be configured to include a server communication unit 210, a server control unit 220, and a server storage unit 230.

The server communication unit 210 is configured to support transmission and reception of information with the terminal 100. For example, the server communication unit 210 may receive a streaming service request from the terminal 100 and, in response to the request, provide a streaming service to the terminal 100. In particular, the server communication unit 210 may receive service quality processing state information from the terminal 100 and deliver the received information to the server control unit 220. Also, the server communication unit 210 may receive a probe-required message for a change in service quality from the terminal 100, and deliver this message to the server control unit 220 to support a process for increasing the service quality.

The server control unit 220 is configured to perform the overall control of the streaming server 200 and may include a streaming data generating module 221, a service quality processing module 222, and a streaming service providing module 223.

The streaming data generating module 221 is configured to generate a streaming data packet to provide a streaming service to the terminal 100. In particular, the streaming data generating module 221 may generate the streaming data packet by receiving content from a content provider and converting the received content into the streaming data packet based on the MMT communication protocol. At this time, packet serial numbers are defined according to packets.

The service quality processing module 222 is configured to determine a streaming service quality in response to a streaming service request from the terminal 100. The streaming service quality may be determined according to service quality processing state information received from the terminal 100. In addition, the streaming service quality may be variably applied according to a service fee schedule for the user of the terminal 100. After determining the streaming service quality, the service quality processing module 222 may periodically change a service quality level by using the service quality processing state information and, in response to a request of the streaming service providing module 223, identify a service quality corresponding to an upper level of the service quality being currently served to the terminal 100. Then, the service quality processing module 222 may offer the changed service quality level or the identified service quality to the streaming service providing module 223.

The streaming service providing module 223 may control the overall process of providing the streaming service to the terminal 100. For example, the streaming service providing module 223 may perform a process of authenticating the terminal 100 in order to establish a communication channel with the terminal 100. In addition, the streaming service providing module 223 may perform a process of transmitting a streaming data packet, requested by the terminal 100, to the terminal 100 with which the communication channel is connected.

In particular, the streaming service providing module 223 may provide streaming data according to the streaming service quality of the terminal 100 determined by the service quality processing module 222. Also, if it is determined that there is a need to change the streaming service quality of the terminal, the streaming service providing module 223 may perform a process of changing the streaming service quality. For example, when a probe-required message for changing the service quality is received from the terminal 100, the streaming service providing module 223 may determine that the streaming service quality needs to be changed.

In addition, the streaming service providing module 223 identify an upper-level service quality to change the service quality by querying the service quality processing module 222 about the upper-level service quality. Thereafter, based on the identified upper-level service quality, the streaming service providing module 223 may transmit the streaming data packet to the terminal 100 by a predetermined number of times in units of a predetermined time. At this time, the streaming service providing module 223 may transmit the streaming data packet to the terminal 100 in response to a probing request message including information on at least a probing interval and a probing number of times.

If a probing response message including information on a average bandwidth, a maximum bandwidth, a minimum bandwidth, and/or a packet loss is received from the terminal 100 after the above transmission, the streaming service providing module 223 may determine, by using the probing response message, whether a service quality increasing condition is satisfied. If so, that is, if a reception response message for the transmitted streaming data packet is received from the terminal 100, the streaming service providing module 223 determines that the terminal 100 is in a state capable of processing the upper-level service quality, and then provides streaming data packet changed with the upper-level service quality.

This process differs from a normal adaptive streaming service. In general, when it is desired to provide a high-quality streaming service to a low-quality terminal 100, a streaming service is first provided with a low quality (A level) and then switched to an encoding manner of a high quality (B level) when a response message is received from the terminal 100. According to this, even if a streaming service of B level is provided to the terminal 100, the terminal 100 cannot process the streaming service. Thus, there is a problem that the streaming service should be provided again with a low quality (A level).

However, when desiring to switch to a high-quality service in response to a change in service quality processing state information, the streaming server 200 of the present disclosure does not immediately switch to the encoding corresponding to the high-quality B level. Instead, the streaming server 200 collects streaming data packets of a current quality in units of a certain time to match a rate corresponding to a high quality (B level), and transmits them to the terminal 100 by a predetermined number of times. Then, the streaming server 200 checks whether the terminal is capable of processing, and in case of being processable, switches to the high-quality encoding. Thus, it is possible to provide an adaptive streaming service to the terminal 100 by quickly determining a switching time point without delay.

In addition, the streaming server 200 of the present disclosure does not provide an adaptive streaming service by adding a separate probing packet, but provide the adaptive streaming service without generation of additional packet by performing a probing procedure using a streaming data packet being currently served.

In addition, the streaming data packet of the present disclosure applied in the above process is preferably generated in accordance with the MMT (MPEG Media Transport) communication protocol, and each streaming data packet is encoded in units of MPU (Media Processing Unit). It is therefore possible to provide the terminal 100 with the streaming data packet immediately changed to have an upper-level service quality at the present time point.

The server storage unit 230 may store and manage various kinds of information necessary for the operation of the streaming server 200 according to an embodiment of the present disclosure.

Hereinbefore, the main elements and operating method of the streaming server 200 according to an embodiment of the present disclosure have been described.

In view of hardware, the streaming server 200 according to an embodiment of this disclosure has the same configuration as a typical web server or network server. However, in view of software, the streaming server 200 includes a program module implemented by means of computer languages such as C, C++, Java, Visual Basic, Visual C, and the like.

Meanwhile, the memory or storage unit equipped in each apparatus of this disclosure stores information therein. In one embodiment, the memory or storage unit is a computer-readable medium. The memory or storage unit may be a volatile memory unit in one embodiment and may be a nonvolatile memory unit in another embodiment. In various embodiments, the memory or storage unit may include, for example, a hard disk device, an optical disk device, or any other high-volume storage device.

In addition, the term "module" used herein may refer to a component or device which is formed of software, hardware, or combination thereof, and performs certain tasks. The module may include, for example, components, such as software components, object-oriented software components, class components and task components, processes, functions, attributes, procedures, subroutines, segments of program code, drivers, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to this disclosure or allow execution thereby. A computer-readable medium may be a machine-readable storage device, a machine-readable storage board, a memory device, a machine-readable composition of material affecting wave-type signaling, or a combination thereof.

Now, an adaptive streaming service providing method according to an embodiment of the present disclosure will be described.

Figure 5:
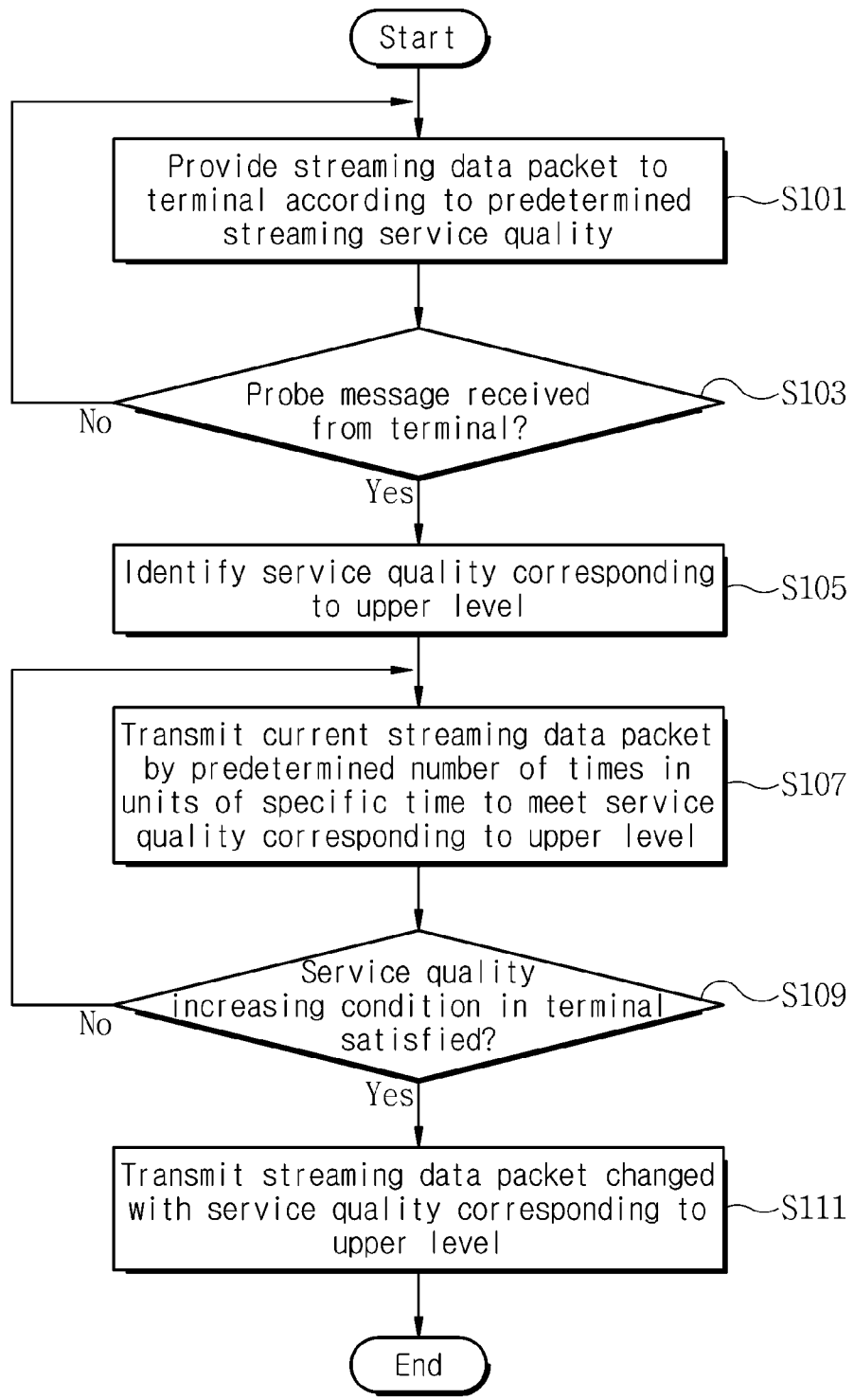
FIG. 5 is a flow diagram illustrating a method for providing an adaptive streaming service according to an embodiment of the present disclosure.

FIG. 5 is a flow diagram illustrating a method for providing an adaptive streaming service according to an embodiment of the present disclosure.

Referring to FIGS. 1 and 5, the streaming server 200 of the present disclosure provides a streaming service in response to a request of the terminal 100 with which a communication channel is connected. The streaming server 200 determines a streaming service quality corresponding to the terminal 100 and provides a streaming data packet corresponding to the determined streaming service quality to the terminal 100 (S101).

Thereafter, the streaming server 200 checks whether a probe-required message is received from the terminal 100 (S103). Here, the probe-required message is generated by the terminal 100 when the service quality processing state information satisfies a predetermined condition, for example, when the terminal 100 using a low-quality service is changed to a state of using a high-quality service. In a state where a probe condition for increasing a service quality is predetermined, the terminal 100 periodically checks the service quality processing state information and determines whether the service quality processing state information satisfies the probe condition. If the service quality processing state information satisfies the probe condition, the terminal 100 generates the probe-required message and transmits it to the streaming server 200. Then, using the probe-required message, the streaming server 200 can perform a process of changing a service quality.

That is, when the probe-required message is received from the terminal 100, the streaming server 200 identifies an upper-level service quality than a current service quality being serviced to the terminal 100 (S105), and transmits a currently provided streaming data packet to the terminal 100 by a predetermined number of times in units of a predetermined time so as to correspond to the identified upper-level service quality (S107).

For example, it is assumed that the service quality determined according to the service quality processing state information received from the terminal 100 is HD (High Definition) class. The streaming server 200 may decode the streaming data packet in accordance with HD video data standard (MPEG2, DiVX, XViD) and provide it to the terminal 100 in a streaming manner.

The terminal 100 receives the HD streaming data packet from the streaming server 200 and reproduces the received streaming data packet. In addition, the terminal 100 periodically generates the service quality processing state information and transmits it to the streaming server 200. Then, the streaming server 200 recognizes the state of the terminal 100 according to the received service quality processing state information and adaptively changes the service quality to meet the state of the terminal 100. That is, even if the current service quality is HD class, but if it is determined that the terminal 100 is in a state incapable of reproducing the HD class, the streaming server 200 changes the service quality to the SD class and provides the streaming data packet corresponding to the SD class to the terminal 100. In this state, when the probe-required message for changing the service quality is received from the terminal 100, the streaming server 200 identifies an upper-level service quality (HD class) than a current service quality (SD class) being serviced to the terminal 100 and then transmits the streaming data packet corresponding to the SD class by a predetermined number of times in units of a predetermined time to correspond to the HD class.

In general, the service quality levels of video data may be classified into LD (Low Definition) class, SD (Standard Definition) class, HD (High Definition) class, and Full HD class. The upper level of the LD class is the SD class, the upper level of the SD class is the HD class, and the upper level of the HD class is the Full HD class. In addition, the transfer rate required for each service quality is 500 kbps for LD class, 1Mbps for SD class, 2Mbps for HD class, and 4 to 8Mbps for Full HD class.

When the service quality currently provided to the terminal 100 is the SD class, the streaming server 200 identifies the upper-level service quality (the HD class) when the probe-required message is received from the terminal 100 and transmits streaming data packets of the SD class to the terminal 100 at intervals of one second in accordance with the transfer rate of the HD class. At this time, the streaming server 200 may transmit the streaming data packets by a predetermined number of times. For example, the streaming server 200 may transmit the streaming data packets to the terminal 100 three times at intervals of one second.

In addition, the streaming server 200 may perform the above-discussed probing procedure by using a bandwidth probing request message (BPQ).

The streaming server 200 receives a probing response message (i.e., a bandwidth proving response message (BPR)) from the terminal 100 and determines whether a service quality increasing condition is satisfied in the terminal 100 (S109). If it is determined that the terminal 100 satisfies the service quality increasing condition, that is, if the terminal 100 successfully receives the packets all three times in the above example, the streaming server 200 determines that the service quality processing state of the terminal 100 is increased. After that, the streaming server 200 encodes the streaming data packet with the HD class and provides it to the terminal 100.

As described above, according to the present disclosure, the streaming server 200 can variably apply the streaming service quality depending on the service quality processing state of the terminal 100 and also can accurately determine the timing for providing the service with a desired service quality.

In addition, it is possible to provide a more efficient adaptive streaming service by variably applying the encoding according to the service quality processing state of the terminal 100 without encoding, storing and managing the streaming data packet according to the respective service qualities.

Also, instead of a method of using a separate probe packet, a method of collecting and transmitting streaming data packets of the current service quality so as to correspond to a desired upper-level service quality is used when the probe procedure for increasing the service quality is performed. Therefore, it is possible to provide a more efficient adaptive streaming service without complicated probing procedure.

Hereinafter, a method for providing an adaptive streaming service according to an embodiment of the present disclosure will be described in more detail.

Figure 6:
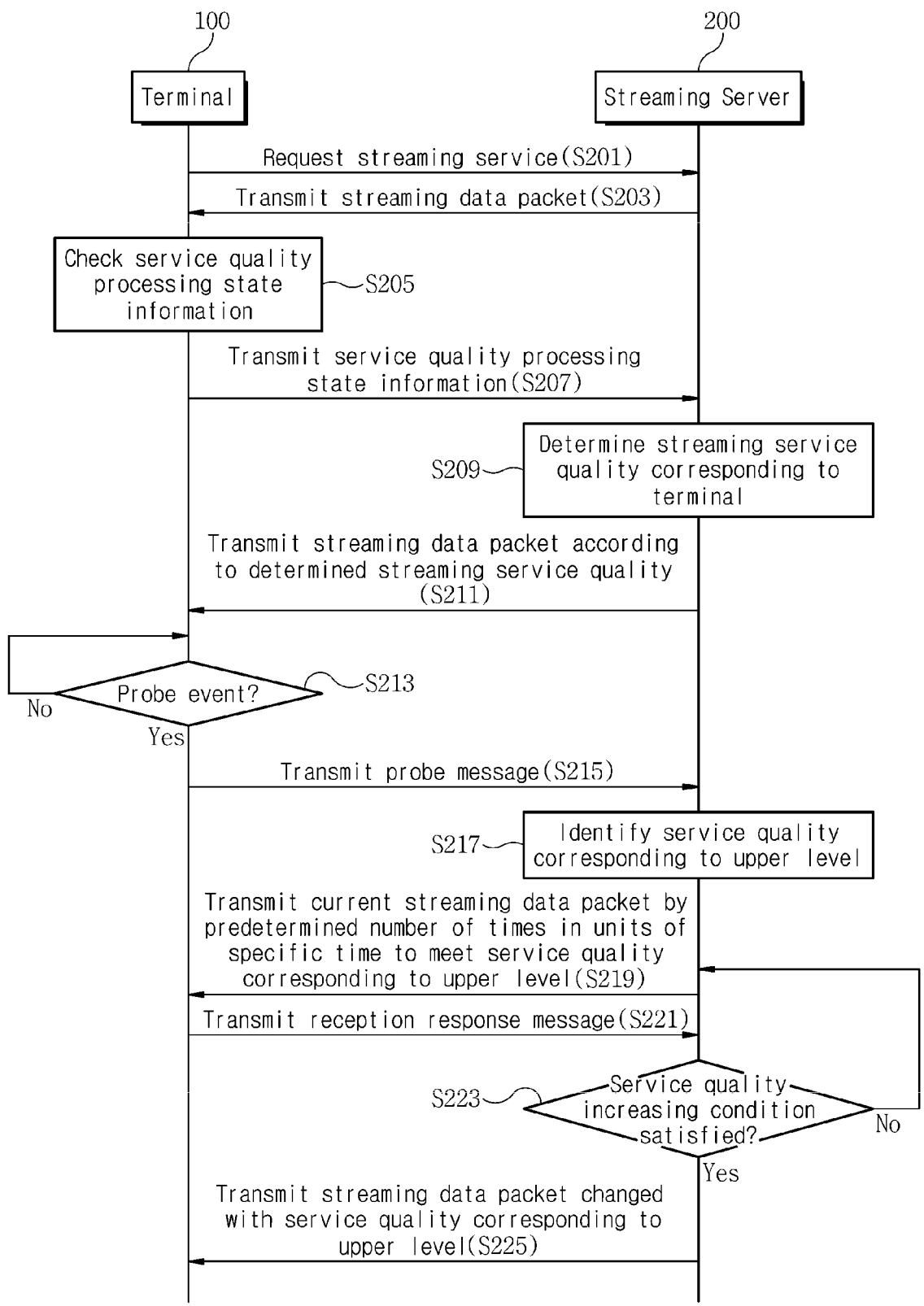
FIG. 6 is a data flow diagram illustrating in detail a method for providing an adaptive streaming service according to an embodiment of the present disclosure.
Figure 7:
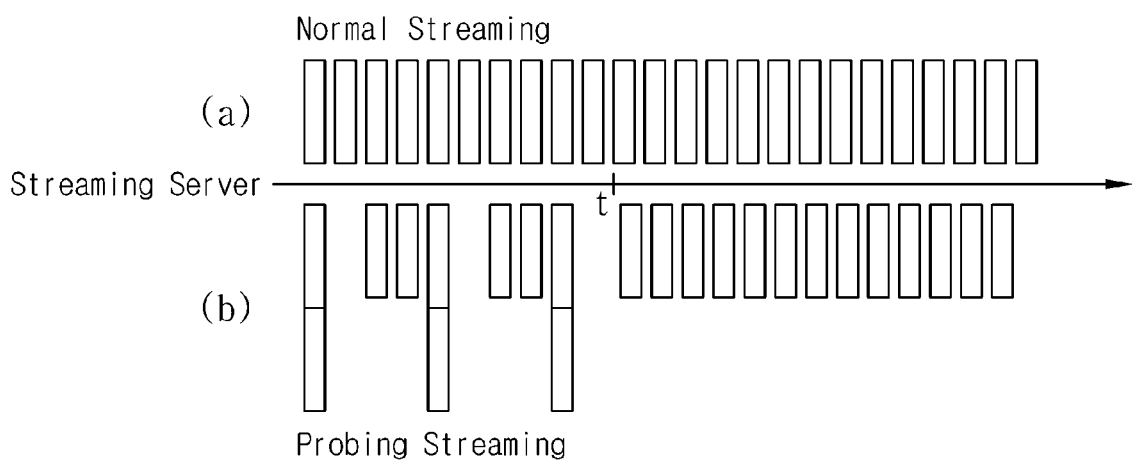
FIGS. 7 and 8 are diagrams illustrating a method for providing an adaptive streaming service according to an embodiment of the present disclosure.
Figure 8:
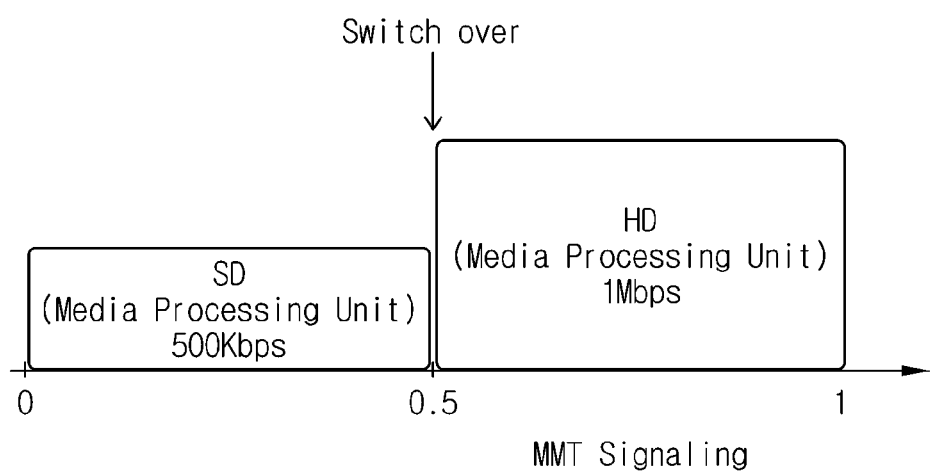

FIG. 6 is a data flow diagram illustrating in detail a method for providing an adaptive streaming service according to an embodiment of the present disclosure. FIGS. 7 and 8 are diagrams illustrating a method for providing an adaptive streaming service according to an embodiment of the present disclosure.

First, referring to FIG. 6, the terminal 100 should access the streaming server 200 in order to use the streaming service provided by the streaming server 200.

Then, the terminal 100 may send a request for the streaming service to the streaming server 200 (S201). Here, the streaming service request may be performed for specific content or a specific channel. Then, the streaming server 200 transmits the corresponding streaming data packet to the terminal 100 (S203). At this time, although not shown, the streaming server 200 may further perform a process of authenticating the user of the terminal 100. Also, the service quality of the initially provided streaming data packet may be set to correspond to the user.

The terminal 100 may continuously receive the streaming data packets from the streaming server 200, store them in a buffer of the terminal 100, and sequentially reproduce them to use the streaming service. At this time, the terminal 100 periodically checks the service quality processing state information (S205).

Herein, the service quality processing state information may include terminal state information and network state information. Specifically, the terminal state information may include information about a current buffer status, a total buffer size, an available buffer size, maximum allowable buffer latency information, a buffering capability such as buffer overflow or underflow, and the like. The network state information related to a communication channel may include a bandwidth, a transmission delay difference between packets, a packet loss rate, a retransmission count for packet loss, and the like.

The terminal 100 periodically transmits the service quality processing state information to the streaming server 200 (S207), and the streaming server 200 determines the streaming service quality corresponding to the terminal 200 in accordance with the service quality processing state information received from the terminal 100 (S209). At this time, the service quality may be determined according to a predetermined condition corresponding to the communication channel. For example, if it is determined that the current state is incapable of processing the HD class any more while HD streaming data packets are transmitted to the terminal 100, that is, if the available buffer size drops below 20%, if the packet loss rate exceeds 5%, if the retransmission count for packet loss exceeds a given threshold x, or if a buffer underflow occurs, the streaming server 200 may change the service quality corresponding to the terminal 100 to the SD class.

Then, the streaming server 200 encodes the streaming data packet with the SD class and transmits it to the terminal 100 (S211).

The terminal 100 whose service quality is changed from a high quality to a low quality continuously checks whether a probe event for increasing the service quality occurs (S213). For example, when a predetermined probe event condition corresponding to the SD-class service quality is satisfied, such as the available buffer size of 30% or more, or the packet loss rate of 1% or less, the terminal 100 determines that the probe event occurs (S213). Then, the terminal 100 generates a probe-required message and transmits it to the streaming server 200 (S215).

Although it is described in this embodiment that the terminal 100 checks the occurrence of the probe event and generates the probe-required message, the present disclosure is not limited to this embodiment. Alternatively, the streaming server 200 may check the occurrence of the probe event on the basis of the service quality processing state information received from the terminal 100.

When the probe-required message is received from the terminal 100, the streaming server 200 identifies an upper-level service quality than a current service quality being provided to the terminal 100 (S217). For example, the streaming server 200 confirms that the SD-class service is currently provided to the terminal 100, and identifies the HD class. Then, the streaming server 200 transmits the streaming data packet, which is encoded with the SD class, by a predetermined number of times at a predetermined time interval to meet the upper-level HD class (S219). That is, as shown in FIG. 7, in the probing streaming procedure according to the probe event occurrence, the streaming data packets transmitted with the SD class are collected at a predetermined time interval and then transmitted to the terminal 100 at a time.

A structure of a bandwidth probing request message (BPQ) according to an embodiment of the present disclosure is shown in Table 1 below.

TABLE 1

| Syntax | Values | No. of bits | Mnemonic |
| --- | --- | --- | --- |
| BPQ_message ( ) { | | | |
|    message_id | | 16 | uimsbf |
|    version | | 8 | uimsbf |
|    length | | 16 | uimsbf |
|    message_payload{ | | | |
|       session_Key | | 32 | uimsbf |
|       interface_type | | 4 | uimsbf |
|       proving_interval | | 4 | uimsbf |
|       proving_number | | 4 | uimsbf |
|       adaptative_flag | | 1 | bslbf |
|    } | | | |
| } | | | |

The main parameters of the probing request message shown in Table 1 are as shown in Table 2 below.

TABLE 2

| Parameter | Description |
| --- | --- |
| Session_Key | This field defines the session key that is randomly generated to ensure the identification of a session between a client and streaming server. The length of this field is 32 bits. |
| Interface_type | It indicates attached network interface type (e.g. wifi, LTE, etc.). If this field is 0xF, it indicates that this video insert to all existing sessions. The length of this field is 4 bits. |
| proving_interval | It indicates the proving interval of packet. The length of this field is 4 bits. |
| proving_number | It indicates the proving number of packet. The length of this field is 4 bits. |
| adaptative_flag | It indicates adaptive streaming function. If this flag is set, it indicates that there enable adaptive streaming scheme. The length of this field is 1 bit. |

That is, the streaming server 200 may perform the probing procedure by transmitting the probing packets by a predetermined number of times (proving_number) in units of a predetermined time (proving_interval) in accordance with the probing request message.

Then, the streaming server 200 receives a bandwidth proving response message (BPR) from the terminal 100 (S221).

The probing response message according to an embodiment of the present disclosure is as follows.

TABLE 3

| Syntax | Values | No. of bits | Mnemonic |
| --- | --- | --- | --- |
| BPQ_message ( ) { | | | |
|    message_id | | 16 | uimsbf |
|    version | | 8 | uimsbf |
|    length | | 16 | uimsbf |
|    message_payload{ | | | |
|       session_Key | | 32 | uimsbf |
|       proving_interval | | 4 | uimsbf |
|       proving_number | | 4 | uimsbf |
|       BW_average | | 16 | uimsbf |
|       BW_max | | 16 | uimsbf |
|       BW_min | | 16 | uimsbf |
|       packet_loss | | 16 | uimsbf |
|    } | | | |
| } | | | |

Contrary to the probing request message, the probing response message may further include parameters of an average bandwidth (BW_average), a maximum bandwidth (BW_max), a minimum bandwidth (BW_min), and a packet loss. The average bandwidth (BW_average) parameter may be allocated to 16 bits and represents an average value for the bandwidth. The maximum bandwidth (BW_max) parameter refers to the maximum bandwidth value during the probing duration and may be allocated to 16 bits. The minimum bandwidth (BW_min) parameter refers to the minimum bandwidth value during the probing duration and may be allocated to 16 bits. The packet loss (packet_loss) parameter relates to the packet loss during the probing duration and may be allocated to 16 bits.

The streaming server 200 that receives the probing response message determines, by using the probing response message, whether the service quality increasing condition is satisfied (S223). For example, if the average bandwidth parameter and the packet loss parameter satisfy the predetermined condition, the streaming server 200 may transmit the streaming data packet changed with an upper-level service quality (S225). In other words, the streaming data packet encoded with the SD class is encoded again with the HD class and then transmitted to the terminal 100.

The streaming data packet of the present disclosure applied in this process is generated according to the MMT (MPEG Media Transport) communication protocol, and each streaming data packet may be encoded in units of MPU (Media Processing Unit). Through this encoding in units of MPU, it is possible to instantly switch from an SD-class streaming data packet to an HD-class streaming data packet as shown in FIG. 8. It is therefore possible to provide a streaming service by quickly changing the service quality without any delay due to a change of service quality and without additional packet.

In addition, the streaming data packet of the present disclosure may be generated according to the MMT communication protocol as described above, and the streaming service including the probing procedure of the present disclosure may perform operations more specialized for mobile communication.

To this end, in another embodiment of the present disclosure, the bandwidth probing request message (BPQ) may be defined as follows to provide a more specialized adaptive streaming service for mobile communication.

TABLE 4

| Syntax | Values | No. of bits | Mnemonic |
| --- | --- | --- | --- |
| BPQ_message ( ) { | | | |
|    message_id | | 16 | uimsbf |
|    version | | 8 | uimsbf |
|    length | | 16 | uimsbf |
|    message_payload{ | | | |
|       MMT_package_id_flag | | 1 | bslbf |
|       CLI_id_flag | | 1 | bslbf |
|    reporting_server_location_flag | | 1 | bslbf |
|       reserved | '1 1111' | 5 | |
|       if (MMT_package_id_flag) { | | | |
|          MMT_package_id { | | | |
|       MMT_package_id_length | N1 | 8 | uimsbf |
|          for (i=0;i<N1;i++) { | | | uimsbf |
|       MMT_package_id_byte | | 8 | |
|          } | | | |
|       } | | | |
|    } | | | |
|    If (CLI_id_flag) { | | 8 | uimsbf |

TABLE 4-continued

| Syntax | Values | No. of bits | Mnemonic |
|---|---|---|---|
|         CLI_id | | | |
|     } | | | |
|     reporting_server_location { | | | |
|         MMT_general_location_info( ) | | Var | |
|     } | | | |
|     probing_packet_location { | | | |
|         MMT_general_location_info( ) | | Var | |
|     } | | | |
|     probing_start_time | | 32 | uimsbf |
|     probing_slot_duration | | 16 | uimsbf |
|     probing_slot_interval | | 16 | uimsbf |
|     probing_slot_number | | 4 | uimsbf |
|     reserved | '1 1111' | 4 | |
|     } | | | |
| } | | | |

The parameters of the probing request message according to another embodiment of the present disclosure shown in Table 4 are as shown in Table 5 below.

TABLE 5

| Parameter | Description |
|---|---|
| MMT_package_id_flag | It indicates whether MMT_package_id is present or not. When this flag is set to '1', MMT_package_id shall be present. When this flag is set to '0', MMT_package_id shall not be present. |
| CLI_id_flag | It indicates whether CLI_id is present or not. When this flag is set to '1', CLI_id shall be present. When this flag is set to '0', CLI_id shall not be present. |
| reporting_server_location_flag | It indicates whether reporting_server_location is present or not. When this flag is set to '1', reporting_server_location shall be present. When this flag is set to '0', reporting_server_location shall not be present. |
| MMT_package_id | It indicates a unique identifier of the Package. It shall be present only when the value of MMT_package_id_flag is set to 1. |
| MMT_package_id_length | It indicates the length in bytes of the MMT_package_id string, excluding the terminating null character. |
| MMT_package_id_byte | It indicates a byte in the MMT_package_id. |
| CLI_id | It indicates an arbitrary integer number to identify NAM which will be used to transmit probing packets among the underlying network. It shall be present only when the value of CLI_id_flag is set to 1. |
| reporting_server_location | It provides the location information of a reporting server where the probing result has to be reported. Only the value of location_type between "0x05" and "0x06" shall be used for an location of the reporting server for probing. It shall be present only when the value of reporting_server_location_flag is set to 1. |
| probing_packet_location | It provides the location information of MMTP packets for probing. Only the values of location_type between "0x00" and "0x02" shall be used for an location of MMTP packets for probing. |
| probing_start_time | It indicates the starting time of a probing event. This field shall be formatted as the "short-format" defined in IETF RFC 5905, NTP version 4, Clause 6. The value of this field shall be the same as the value of the timestamp field in the MMTP header of the first probing packet. |
| probing_slot_duration | It indicates the duration of a probing slot consisting a probing event signaled by this message in units of milliseconds. A probing event is a group of one or more probing slots which have the same duration and interval. |
| probing_slot_interval | It indicates the interval between probing slots in units of milliseconds. |

TABLE 5-continued

| Parameter | Description |
| --- | --- |
| probing_slot_number | It indicates one less than the number of probing slots consisting a probing event signaled by this message minus 1. A value 0 indicates that the probing event has only one probing slots, A value 1 indicates that it has two probing slots, etc. |

The probing request message more specialized for mobile communication is as follows. This probing request message is defined to provide a mechanism for examining the available bandwidth in mobile communication and is a message format that can be defined in accordance with the MMT communication protocol.

When the probe-required message is received from the terminal 100 in a state where MMT streaming data packets are provided to an MMT client, i.e., the terminal 100, supporting the MMT communication protocol in accordance with a predetermined streaming service quality, the streaming server 200 defines the probing request message as shown in Table 4 and transmits it to the terminal 100. At this time, the probing request message more specialized for the mobile communication is defined to include information in accordance with the MMT communication protocol, such as MMT package identification information (MMT_Package_id) for MMT streaming data being transmitted to the terminal 100, MMT location information (MMT_general_location) for current transmission, and information about un upper packet for probing (probing_packet_location).

In addition, the streaming server 200 defines the probing request message to include information for the probing procedure, such as a probe starting time (probing_start_time), a probing duration (probing_slot_duration), a probing interval (probing_slot_interval), and a probing number of times (probing_slot_number).

Here, the probing start time (probing_start_time) indicates a start time of a probing event, and may be expressed by a timestamp of a header of a probing packet. The probing duration (probing_slot_duration) indicates a time period during which a probing event is maintained. The probing interval (probing_slot_interval) indicates an interval between probing slots. The probing number of times (probing_slot_number) indicates the number of probing packet transmissions during a probing event period.

The streaming server 200 defines the probing request message as described above and performs the probing procedure by transmitting the probing packets by a predetermined number of times (the probing number of times) in units of a certain time (the probing interval) in accordance with the defined probing request message.

In case of defining the probing request message according to another embodiment as described above and transmitting it to the terminal 100, the streaming server 200 receives a bandwidth probing response message (BPR) according to another embodiment of the present disclosure from the terminal 100.

The probing response message according to another embodiment of the present disclosure is as follows.

TABLE 6

| Syntax | Values | No. of bits | Mnemonic |
| --- | --- | --- | --- |
| BPR_message ( ) { | | | |
|     message_id | | 16 | uimsbf |
|     version | | 8 | uimsbf |
|     length | | 16 | uimsbf |
|     message_payload{ | | | |
|         MMT_package_id_flag | | 1 | bslbf |
|         CLI_id_flag | | 1 | bslbf |
|         Mobile_info_descriptor_flag | | 1 | bslbf |
|         reserved | '1 1111' | 5 | |
|         if (MMT_package_id_flag) { | | | |
|             MMT_package_id { | | | |
|   MMT_package_id_length | N1 | 8 | uimsbf |
|         For(i=0;i<N1;i++) { | | | |
|   MMT_package_id_byte | | 8 | uimsbf |
|         } | | | |
|     } | | | |
|   } | | | |
|   if (CLI_id_flag) { | | 8 | |
|         CLI_id | | | uimsbf |
|   } | | | |
|   if(Mobile_info_descriptor_flag) { | | | |
| Mobile_info_descriptor( ) | | | |
|   } | | | |
|   average_rate | | 1 | bslbf |
|   peak_rate | | 1 | bslbf |
|   packet_loss_ratio | '1 1111' | 5 | bslbf |
| } | | | |
| } | | | |

The structure of the probing response message according to another embodiment of the present disclosure shown in Table 6 is as shown in Table 7 below.

TABLE 7

| Parameter | Description |
| --- | --- |
| MMT_package_id_flag | It indicates whether MMT_package_id is present or not. When this flag is set to '1', MMT_package_id shall be present. When this flag is set to '0', MMT_package_id shall not be present. |
| CLI_id_flag | It indicates whether CLI_id is present or not. When this flag is set to '1', CLI_id shall be present. When this flag is set to '0', CLI_id shall not be present. |
| Mobile_info_descriptor_flag | It indicates whether Mobile_info_descriptor( ) is present or not. When this flag is set to '1', Mobile_info_descriptor( ) shall be present. When this flag is set to '0', Mobile_info_descriptor( ) shall not be present. |
| MMT_package_id | It indicates a unique identifier of the Package. It shall be present only when the value of MMT_package_id_flag is set to 1. |
| MMT_package_id_length | It indicates the length in bytes of the MMT_package_id string, excluding the terminating null character. |
| MMT_package_id_byte | It indicates a byte in the MMT_package_id. |
| CLI_id | It indicates an arbitrary integer number to identify NAM for the probing event reported by this message among the underlying network. It shall be present only when the value of CLI_id_flag is set to 1. |
| Mobile_info_descriptor( ) | It contains information which is associated with an MMT receiving entity in a mobile network. It shall be present only when the value of Mobile_info_descriptor_flag is set to 1. |
| average_rate | It indicates the average bitrate of received MMTP packets measured during a probing event in units of kilobits per second. The value of this field is the average of the bitrate of each probing slot and the bitrate of each probing slot is calculated by dividing the total number of bits in MMTP packets received during the probing slot by the duration of it. |
| peak_rate | It indicates the peack bitrate in a probing event in units of kilobits per second. The value of this field shall be set to as the maximum value over all bitrates for each probing slot. |
| packet_loss_ratio | It indicates the ratio between the number of lost MMTP packets and the total number of transmitted packets within the probing event. The value of this field shall be calculated by taking the integer part after multiplying the loss fraction by 256. |

That is, the probing response message according to another embodiment includes information on an MMT receiving entity and a reception measurement result of a probing packet. The information on the MMT receiving entity is defined through a mobile information descriptor (Mobile_info_descriptor), which includes information related to the MMT receiving entity, i.e., the terminal 100, when the MMT receiving entity is a mobile device. For example, when the MMT receiving entity is a cellular mobile device, it may include mobile identification information such as MSISDN or cell ID defined in 2GPP. Also, a mobile_info_descriptor_flag field is defined to indicate whether the mobile information descriptor is executed. If the field value is 1, the above-described probing response message may be reported to the streaming server 200.

In addition, the probing response message defines information on the measurement result of the probing event as the measurement result of the probing packet reception, and may include information on an average bandwidth (average_rate), a bandwidth peak (peak_rate), and a packet loss ratio (packet_loss_ratio). The average bandwidth (average_rate) represents an average value for the bandwidth during a probing event duration (probing_slot_duration), and the bandwidth peak (peak_rate) represents the maximum bandwidth value during the probing event duration. Also, the packet loss ratio (packet_loss_ration) relates to the packet loss during the probing event duration.

In this way, the terminal 100 defines the probing response message to include the information on the MMT receiving entity and information on the measurement result of the probing event and transmits it to the streaming server 200. Then, the streaming server 200 may determine, by using the probing response message, whether the service quality increasing condition is satisfied. For example, when it is determined that the average bandwidth, the bandwidth peak, and the packet loss ratio in the probing response message satisfy the predetermined condition, the streaming server 200 transmits the streaming data packet changed to an upper-level service quality.

As described above, the streaming server 200 of the present disclosure can instantly switch to the streaming data packet corresponding to the upper level and provide the streaming service to the terminal 100. In addition, the streaming service can be provided by quickly changing the service quality without any delay due to a change of service quality and without additional packet.

Hereinbefore, the method for providing the adaptive streaming service according to embodiments of the present disclosure has been described.

The above-described adaptive streaming service providing method of the present disclosure may be provided in the form of a computer-readable medium suitable for storing computer program instructions and data. A program recorded on a recording medium for implementing the adaptive streaming service providing method according to an embodiment of the present disclosure may enable the streaming server to provide a streaming data packet to a terminal according to a predetermined streaming service quality; identify an upper-level service quality than a current service quality being served to the terminal when it is determined that there is a need to change the streaming service quality corresponding to the terminal; transmit a streaming data packet, being provided to the terminal, by a predetermined number of times at a certain time interval to correspond to the identified upper-level service quality; and when a service quality increasing condition is satisfied in the terminal, transmit a streaming data packet changed with the identified upper-level service quality.

In this case, the program recorded on the recording medium may perform the above-described functions by being read, installed and executed in the computer.

In order to allow the computer to read the program recorded on the recording medium and to execute the functions implemented by the program, the above-described program may include codes encoded in computer languages such as C, C++, JAVA, and machine language which can be read through a device interface of the computer by a processor (CPU) of the computer.

This code may include a function code related to a function or the like that defines the above-described functions, and may include an execution procedure-related control code necessary for the processor of the computer to execute the above-described functions in accordance with a predetermined procedure. Also, such a code may further include a memory reference related code as to which additional information or media required for the processor of the computer to execute the above-described functions should be referenced at any location (address) of the internal or external memory of the computer. In addition, when the processor of the computer needs to communicate with any other computer, server, etc., which are at remote locations, to perform the above-described functions, the code may further include a communication-related code as to how to communicate with which remote computer, server, etc., what information or media should be transmitted or received during communication, and the like.

This computer-readable medium, e.g., a recording medium, suitable for storing computer program instructions and data includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit.

Further, the computer-readable recording medium may be distributed over networked computer systems so that computer-readable code can be stored and executed in a distributed fashion. In addition, functional programs and their associated code and code segments for implementing the present disclosure may be easily deduced or altered by programmers of the technical field of the present disclosure in consideration of the system environment of a computer that reads a recording medium and executes the program.

While this disclosure contains many specific implementation details, these should not be construed as limitations on the scope of the disclosure or of what may be claimed, but rather as descriptions of features that may be specific to particular embodiments of particular disclosure. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

The present disclosure relates to technology of providing an adaptive streaming service. More particularly, the present disclosure relates to a method and apparatus for providing an adaptive streaming service by adaptively changing the quality of a streaming service in consideration of a service quality processing state in a terminal using the streaming service.

According to the present disclosure, when desiring to increase the service quality according to the service quality processing state in the terminal while streaming data packets are being transmitted to the terminal, it is possible to quickly switch to a high-quality streaming service without any service delay by collecting and transmitting streaming data packets so as to correspond to a desired upper-level service quality. Accordingly, the present disclosure may contribute to the development of the streaming service industry.

In addition, the present disclosure has a good possibility of sales on the market or business and therefore has industrial applicability suitable for practical and apparent implementation.

What is claimed is:

1. A method for providing an adaptive streaming service at a streaming server, the method comprising:
   providing a streaming data packet to a terminal, the streaming data packet corresponding to a predetermined streaming service quality;
   identifying an upper-level service quality than a current service quality being served to the terminal when a probe-required message for a service quality change is received from the terminal;
   determining, in response to the probe-required message, a probing request message including a probing number of times and a predetermined probing interval, and transmitting the probing request message to the terminal;

transmitting a probing packet corresponding to the upper-level service quality to the terminal by the probing number of times at the predetermined probing interval according to the probing request message;

receiving a probing response message including a reception measurement result of the probing packet from the terminal;

determining, by using the probing response message, whether a service quality increasing condition is satisfied;

when the service quality increasing condition is satisfied in the terminal, determining the upper-level service quality as a streaming service quality of streaming data; and transmitting a streaming data packet changed with the determined streaming service quality to the terminal, wherein the transmitting the probing packet to the terminal includes transmitting the probing packet corresponding to the upper-level service quality to the terminal according to the probing request message defined in accordance with an MMT communication protocol and including packet information for probing (probing packet location), a probing start time (probing start time), a probing duration (probing slot duration), a probing interval (probing slot interval), and a probing number of times (probing slot number).

2. The method of claim 1, further comprising: before the providing the streaming data packet to the terminal, receiving service quality processing state information from the terminal according to a streaming service provision request of the terminal; and determining a streaming service quality to be provided to the terminal according to the received service quality processing state information.

3. The method of claim 1, wherein the probe-required message for the service quality change occurs when service quality processing state information of the terminal satisfies a predetermined condition.

4. The method of claim 3, wherein the service quality processing state information includes terminal state information and network state information measured by the terminal.

5. A method for providing an adaptive streaming service at a streaming server, the method comprising:

providing a streaming data packet to a terminal, the streaming data packet corresponding to a predetermined streaming service quality;

identifying an upper-level service quality than a current service quality being served to the terminal when a probe-required message for a service quality change is received from the terminal;

determining, in response to the probe-required message, a probing request message including a probing number of times and a predetermined probing interval, and transmitting the probing request message to the terminal;

transmitting a probing packet corresponding to the upper-level service quality to the terminal by the probing number of times at the predetermined probing interval according to the probing request message;

receiving a probing response message including a reception measurement result of the probing packet from the terminal;

determining, by using the probing response message, whether a service quality increasing condition is satisfied;

when the service quality increasing condition is satisfied in the terminal, determining the upper-level service quality as a streaming service quality of streaming data; and transmitting a streaming data packet changed with the determined streaming service quality to the terminal, wherein the probing response message includes, in addition to the reception measurement result of the proving packet, a mobile information descriptor (mobile_info_descriptor) having information on an MMT receiving entity, and wherein the reception measurement result of the probing packet is composed of the information on the MMT receiving entity and information on a average bandwidth (average_rate), a bandwidth peak (peak_rate), and a packet loss ratio (packet_loss_ratio).

6. A streaming server comprising a processor, wherein said processor is configured to:

determine a streaming service quality corresponding to a terminal that requests a streaming service;

identify an upper-level service quality than the streaming service quality in response to a request of a streaming service providing module;

provide a streaming data packet to the terminal according to the determined streaming service quality;

identify, through the service quality processing module, the upper-level service quality than a current service quality being served to the terminal when a probe-required message for a service quality change is received from the terminal;

determine, in response to the probe-required message, a probing request message including a probing number of times and a predetermined probing interval, and transmit the probing request message to the terminal;

transmit a probing packet corresponding to the upper-level service quality to the terminal by the probing number of times at the predetermined probing interval according to the probing request message;

receive a probing response message including a reception measurement result of the probing packet from the terminal;

determine, by using the probing response message, whether a service quality increasing condition is satisfied;

when the service quality increasing condition is satisfied in the terminal, determine the upper-level service quality as a streaming service quality of streaming data; and transmit a streaming data packet changed with the determined streaming service quality to the terminal, wherein said processor is configured to transmit the probing packet corresponding to the upper-level service quality to the terminal according to the probing request message defined in accordance with an MMT communication protocol and including packet information for probing (probing packet location), a probing start time (probing start time), a probing duration (probing slot duration), a probing interval (probing slot interval), and a probing number of times (probing slot number).

7. The streaming server of claim 6, wherein the streaming data packet is generated in accordance with an MMT (MPEG Media Transport) communication protocol, and each streaming data packet is encoded in units of MPU (Media Processing Unit).

8. The streaming server of claim 6, wherein said processor is further configured to:

receive the probing response message corresponding to the probing request message from the terminal, wherein the probing response message includes a mobile information descriptor (mobile_info_descriptor) and a reception measurement result of a probing packet, wherein the mobile information descriptor has information on an MMT receiving entity, and wherein the reception measurement result of the probing packet is composed of information on a average bandwidth (average_rate), a bandwidth peak (peak_rate), and a packet loss ratio (packet_loss_ratio).

\* \* \* \* \*